US011775533B2

(12) United States Patent
Lin et al.

(10) Patent No.: US 11,775,533 B2
(45) Date of Patent: Oct. 3, 2023

(54) CUSTOMIZING SEARCH QUERIES FOR INFORMATION RETRIEVAL

(71) Applicant: Capital One Services, LLC, McLean, VA (US)

(72) Inventors: Alexander Lin, Arlington, VA (US); Cruz Vargas, Alexandria, VA (US); Joshua Edwards, Philadelphia, PA (US); Max Miracolo, Brooklyn, NY (US); Mia Rodriguez, Arlington, VA (US); Phoebe Atkins, Rockville, VA (US)

(73) Assignee: Capital One Services, LLC, McLean, VA (US)

( * ) Notice: Subject to any disclaimer, the term of this patent is extended or adjusted under 35 U.S.C. 154(b) by 156 days.

(21) Appl. No.: 17/149,487

(22) Filed: Jan. 14, 2021

(65) Prior Publication Data

US 2022/0222260 A1 Jul. 14, 2022

(51) Int. Cl.
*G06F 17/00* (2019.01)
*G06F 16/2457* (2019.01)
*G06F 16/248* (2019.01)
*G06N 20/00* (2019.01)

(52) U.S. Cl.
CPC ...... *G06F 16/24575* (2019.01); *G06F 16/248* (2019.01); *G06N 20/00* (2019.01)

(58) Field of Classification Search
CPC ............. G06F 16/24575; G06F 16/248; G06F 16/9535; G06N 20/00
See application file for complete search history.

(56) References Cited

U.S. PATENT DOCUMENTS 9,298,777 B2 3/2016 Lawrence
10,078,696 B1 9/2018 Sadler
2006/0047656 A1* 3/2006 Dehlinger ............... G06F 16/93

(Continued)

OTHER PUBLICATIONS

Wei Lu et al., Fixed versus dynamic co-occurrence windows in TextRank term weights for information retrieval. Proceedings of the 35th international ACM SIGIR conference on Research and development in information retrieval , Asso. for Computing Machiniery, 1079-1080, <https://doi.org/10.1145/23>, Aug. 2012.*

(Continued)

*Primary Examiner* — Greta L Robinson
(74) *Attorney, Agent, or Firm* — Banner & Witcoff, Ltd.

(57) ABSTRACT

Methods and systems disclosed herein describe customizing searching. Search queries may be customized according to a user's preferences. A user may emphasize or indicate that additional weight should be given to one or more terms in a search query. Terms that are weighted higher may have a larger impact on the results that are returned in response to the search query. In addition to changing the terms in a search query, a user may provide a weight for each term. Each term in a search query may be weighted to varying degrees, giving a user more control over the results that are returned. The weights may be used with machine learning techniques to generate a vector representation of a search query. The vector representation of the search query may be compared with vector representations of search objects to determine results that match the search query.

20 Claims, 10 Drawing Sheets

(56) References Cited

U.S. PATENT DOCUMENTS

| | | | | |
|---|---|---|---|---|
| 2015/0032717 | A1* | 1/2015 | Cramer | G06F 16/24575 |
| | | | | 707/709 |
| 2018/0357240 | A1* | 12/2018 | Miller | G06F 16/3329 |
| 2019/0073404 | A1* | 3/2019 | Klouche | G06F 16/9038 |
| 2019/0087472 | A1* | 3/2019 | Dong | G06F 16/3326 |

OTHER PUBLICATIONS

Nemanja Djuric et al., Hierarchical Neural Language Models for Joint Representation of Streaming Documents and their Content. In Proceedings of the 24th International Conference on World Wide Web, Inter. World Wide Web Conferences Steering Committee, 248-255, <https://doi.org/10.1145/2736277.27>, May 2015.*

Gloria Feher et al., Retrieving Multi-Entity Associations: An Evaluation of Combination Modes for Word Embeddings. In Proceedings of the 42nd Inter. ACM SIGIR Confer. on Research and Development in Information Retrieval , Asso. for Computing, 1169-1172.< https://doi.org/10.1145/3331184.333136>, Jul. 2019.*

Hang Li et al., Deep Learning for Information Retrieval. In Proceedings of the 39th International ACM SIGIR conference on Research and Development in Information Retrieval, Association for Computing Machinery, 1203-1206, <https://doi.org/10.1145/2911451.2914800>, Jul. 2016.*

Sheikh, Imran, Illina, Irina, Fohr, Dominique, Linares, Georges, "Learning Word Importance with the Neural Bag-of-Words Model", Proceedings of the 1st Workshop on Representation Learning for NPL, Aug. 11, 2016, Berlin Germany, pp. 222-229.

* cited by examiner

100

401 ⌒ User ID 123

| Word 405 | Word Weight 410 |
|---|---|
| Sentiment | 2 |
| Continuous | 5 |
| Arbitrage | 3 |

First Vector
Representation
805

[-0.56, 0.27, 0.05, 0.18, 0.15,..., 0.14]

Second Vector
Representation
810

[-0.375, 0.155, 0.02, 0.06, 0.07,..., 0.055]

Average Vector
Representation
815

CUSTOMIZING SEARCH QUERIES FOR INFORMATION RETRIEVAL

FIELD OF USE

Aspects of the disclosure relate generally to information retrieval and, more specifically, to using machine learning to customize searching.

BACKGROUND

A user may input a search query comprising one or more words to retrieve information relevant to the search query. The user may try to find better search results by adding words to the query or removing words from the query. The user may also try to find better search results by using search operators. For example, a search operator may force a search engine to find the exact words in a phrase or a search operator may force a search engine to find results that have particular words in the title of a document or webpage. However, a search query can be difficult to tailor to a specific user's needs. A search engine may treat each word in a search query equally, making it difficult for a user to fine-tune results received from the search engine.

Aspects described herein may address these and other problems, and generally improve a user's ability to customize search queries and obtain more relevant results.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Search queries may be customized according to a user's preferences. A user may emphasize or indicate that additional weight should be given to one or more terms (e.g., words, numbers, etc.) in a search query (e.g., via a user interface). Terms that are weighted higher may have a larger impact, as compared to other words in the search query, on the results that are returned in response to the search query. In addition to changing the terms in a search query, a user may provide a weight for each term. Each term in a search query may be weighted to varying degrees, giving a user more control over the results that are returned. The weights may be used with machine learning techniques to generate a vector representation of a search query. For example, machine learning may be used to generate vector representations of terms in a search query and/or the vector representation of the search query. The vector representation of the search query may be compared with vector representations of search objects to determine results that match the search query. The weights may be applied to terms/words in search objects and/or the search query, allowing more relevant results to the user's search query to be found. For example, a search for "Philadelphia eagles" may lead to search results for the football team (e.g., the Philadelphia Eagles) based on an indication of a user's interest in football and/or a prior indication that additional weight should be given to words related to football (e.g., football scores, football players on the Philadelphia Eagles roster, etc.). Conversely, if the user has previously indicated that additional weight should be given to terms related to birdwatching (ornithology) or types of birds, the search results may comprise bird watching/eagle spotting locations near Philadelphia.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 4 shows an example of word weights associated with a user profile;

FIG. 8 shows example vector representations of words that may be used to generate a vector representation of a search query.

DETAILED DESCRIPTION

Figure 1:
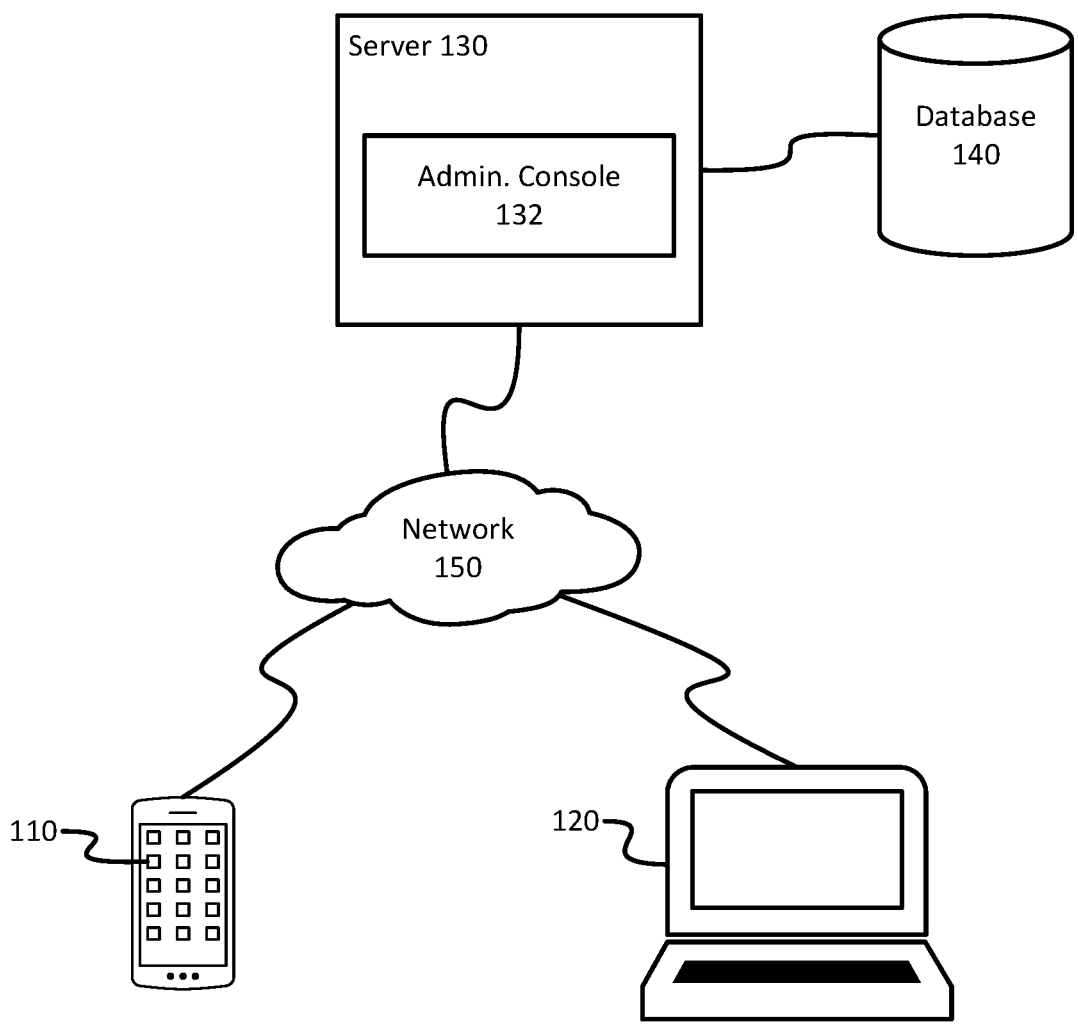
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for using machine learning to customize searching and/or information retrieval. As noted above, search processes may be difficult to fine-tune according to the needs of a user. A user may be limited to adding terms to a search query, removing terms from a search query, and/or using search operators. In this regard, a user may have limited control over a search process, which may lead to difficulties in locating results that the user is searching for.

Methods and systems as described herein may enable customization of search queries, search objects, and/or the results that are returned in response to a search request. A user may emphasize and/or indicate that additional weight should be given to one or more terms (e.g., words, numbers, etc.) in a search query (e.g., via a user interface). The user may highlight a term in a search query to indicate that the term should be given additional weight. Additionally or alternatively, the user may provide a rating (e.g., on a scale of 1 to 5) to indicate a weight for a term or the user may input a value (e.g., any real number) to indicate the weight that should be given for a term. Terms that are weighted higher may have more influence on the results that are returned in response to the search query. For example, the results may have more occurrences of the term that has a higher weight, or a result may be selected based on the topic of the result being associated with the term that has the higher weight, as compared to other terms in the search query. Each term in a search query may be weighted to varying degrees, giving a user more control over the results that are returned. The weights may be used with machine learning techniques to generate a vector representation of a search query. For example, machine learning may be used to generate vector representations of terms in a search query and/or the vector representation of the search query. A distance metric may be used to compare the vector representation of the search query with vector representations of search objects to determine results for the search. The weights may be applied to terms/words in search objects and/or the search query, allowing more relevant results to the user's search query to be found.

By adjusting the weights of search terms and/or search objects, a user may have additional control over the results that are returned in a search request. For example, in a traditional search request, a user may use a search operator to force a search engine to provide only results that contain a particular word (e.g., be enclosing the particular word in quotations). Systems and methods described herein may give more flexibility to a search request by emphasizing (e.g., increasing the weight) one or more terms in a search query without forcing the search engine to return only results that comprise the one or more words. This may increase the efficiency of a search request and/or system because the system may be able to find more relevant results with less search queries (e.g., a user may not need to submit as many search queries to find results that the user is looking for). The user may have a better user experience because the user may be able to better location information that the user is searching for with fewer queries. Additionally, fewer search queries may reduce network traffic and/or may use require less processing power.

Turning to FIG. 1, a system 100 is shown that includes a first user device 110, a second user device 120, and a server 130, connected to a first database 140, interconnected via network 150. First user device 110 may be a mobile device, such as a cellular phone, a mobile phone, a smart phone, a tablet, or a laptop. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may include a locking application that uses machine learning to establish locking and unlocking conditions for first user device 110. The locking application may be obtained from an online retail store or a digital distribution service, such as iTunes® or Google Play®. Alternatively, the locking application may be installed by an administrator, for example, as part of a mobile device management (MDM) program. In some embodiments, the locking application may be a default locking mechanism on the device, installed by a manufacturer of the device or the developer of the device's operating system.

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet. In some embodiments, second user device 120 may include a locking application that uses machine learning to establish locking and unlocking conditions for first user device 110.

Server 130 may be any server capable of executing administrative console 132. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

Administrative console 132 may be server-based software configured to provide an administrator (e.g., system administrator, network administrator) with management tools to administer a network. These tools may allow the administrator to remotely manage devices, add devices to the network, change passwords, reset passwords, provision new user accounts, de-provision user accounts, etc. In some instances, the administrative console 132 may allow an administrator to remotely lock a device. Alternatively, the administrative console 132 may allow an administrator to unlock a device, for example, when a user forgets their password or unlock conditions. In this regard, an administrator may adhere to certain policies when unlocking a user's device. For example, the administrator may unlock the device in accordance with the two-man rule or, alternatively, the three-man rule.

First database 140 may be configured to store information on behalf of administrative console 132. According to some embodiments, first database 140 may be a database or table configured to provide directory services, for example, using Lightweight Directory Access Protocol (LDAP), Active Directory, or an equivalent directory service. For instance, first database 140 may include a corporate directory that comprises employees' information, such as the employees' first and last names, usernames, email addresses, phone numbers, department information, etc. In some embodiments, first database 140 may be encrypted to protect the information contained therein. First database 140 may include, but are not limited to relational databases, hierarchical databases, distributed databases, in-memory databases, flat file databases, XML databases, NoSQL databases, graph databases, and/or a combination thereof.

First network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
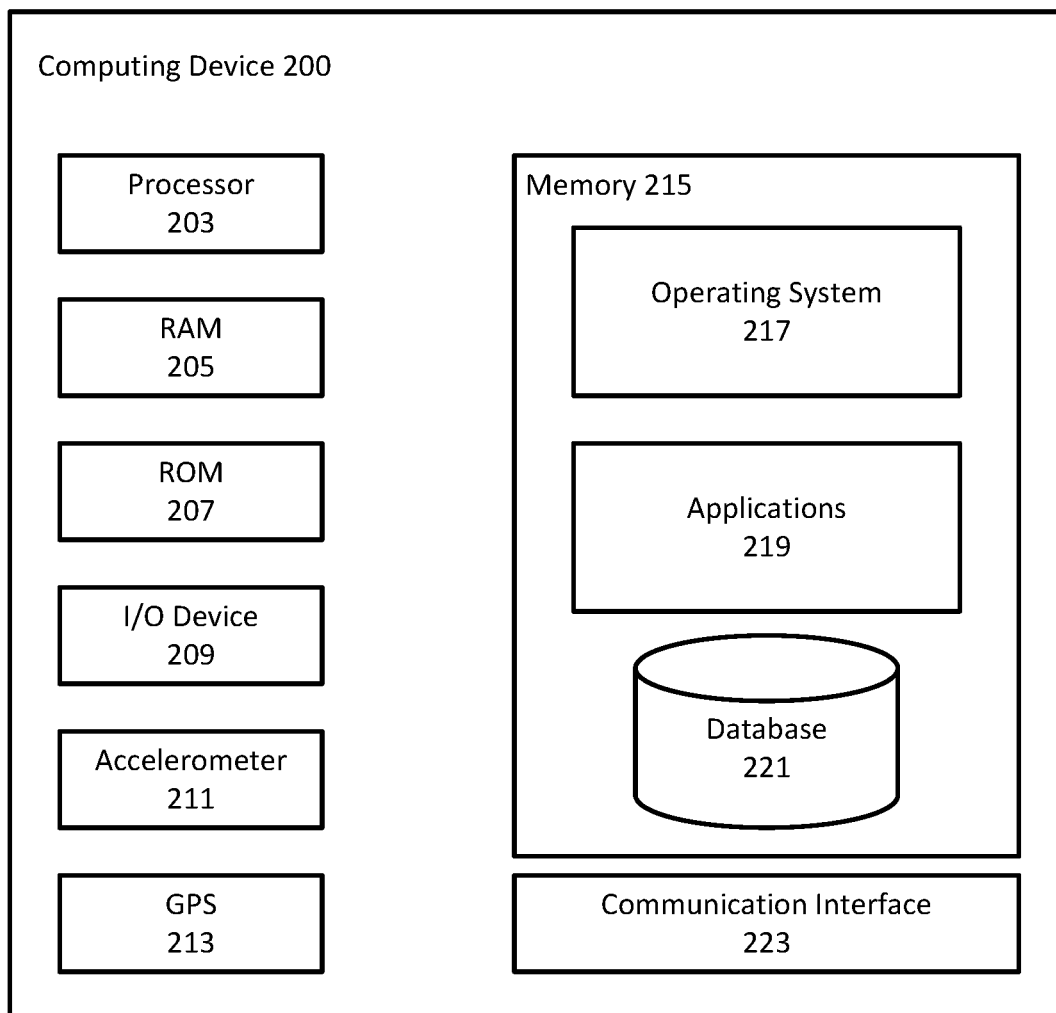
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. In some embodiments, I/O device 209 may include an image capture device, such as a camera. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user. In the context of a locking application, GPS receiver/antenna 213 may be used to locate the computing device 200 to determine whether a current location is a location that satisfies an unlock condition. In some embodiments, GPS receiver/antenna 213 may be used to determine the orientation of a device (e.g., facing north), as part of determining whether an unlock condition is satisfied.

Communication interface 223 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
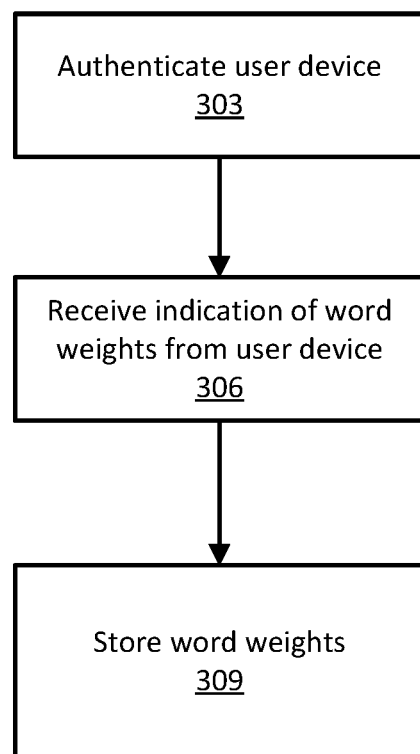
FIG. 3 shows an example method for storing word weights associated with a user profile.

Users may wish to customize a search query to better find information that the user is looking for. For example, a user may want information that more closely corresponds to a first term in the search query over a second term in the search query. The user may indicate that a particular weight should be given to the first term and/or that weight given to the second term should remain unmodified. It may be beneficial for the user's experience to be able to save words and/or word weights associated with those words so that they can be used in future searches associated with the user. The weights may also be saved so that they can be used with searches performed by other users. FIG. 3 shows an example method for storing word weights associated with a user. The example method may be performed using any device or component described in connection with FIGS. 1-2. Although one or more steps of FIG. 3 are described for convenience as being performed by the server 130, or the first user device 110, one, some, or all of such steps may be performed by the second user device 120, the computing device 200, or one or more other computing devices, and steps may be distributed among one or more computing devices, including any computing devices such as those described in connection with FIGS. 1-2. One or more steps of FIG. 3 may be rearranged, modified, repeated, and/or omitted.

At step 303, the server 130 may authenticate a user device. The server 130 may receive a request to login from the first user device 110. The request to login may include one or more credentials of a user. For example, a user of the first user device 110 may input a username and password at the first user device 110. The request to login may comprise one or more biometric samples (e.g., facial image, fingerprint scan, voiceprint, etc.), one or more one-time passwords, one or more tokens, and/or any other information suitable for authentication. The first user device 110 may send the username and password for authentication by the server 130. In response to receiving the one or more credentials, the server (e.g., server 130) may verify the one or more credentials provided by the user. When the one or more credentials are invalid, server 130 may deny the login request. However, when the one or more credentials are valid (e.g., match previously stored credentials), the server 130 may authenticate the first user device 110 and proceed to step 306.

At step 306, the server 130 may receive an indication of one or more weights from the first user device 110. The indication may be provided via a user interface. For example, the user interface may comprise a settings interface from which the user may define search preferences associated with their profile. Accordingly, words may be weighted in accordance with stored user preferences. Additionally or alternatively, the user interface may comprise a search interface. As described in greater detail below, the user may assign a weight to one or more terms of the search query, for example, using the search interface.

A weight may correspond to a term in a search query. A user associated with the first user device 110 may indicate one or more weights by highlighting one or more words in a search query. By highlighting a word, the user may indicate that the word should be weighted higher than other words that are not highlighted. Different colored highlighting may indicate different weights. For example, a word that is highlighted yellow may be weighted higher than a word that is highlighted blue. The word that is highlighted blue may be weighted higher than a word that is not highlighted. Additionally or alternatively, a user may input a value indicating a weight of a word (e.g., a term in the search query). Words may be weighted, based on input from a user, on a scale (e.g., 1-5, 1-10, etc.). For example, a word that is not given additional weight by the user may be assigned the weight of 1. A user may assign words weights based on how much importance the word should be given, for example, when determining search results that match the query. Increasing values may increase the weight (e.g., importance) given to a word in the query. For example, a word assigned the weight of 2 may be weighted higher than a word that is not given additional weight. A word assigned the weight of 3 may be weighted higher than a word that is assigned the weight of 2, and so on. Additionally or alternatively, a user may input a value for the weight. For example, a user interface (UI) may include a field for each term in the search query where the user may input a value for the weight of the corresponding term. Additionally or alternatively, the UI may allow the user to right-click a term and enter a weight for the term. The value may be a real number, an integer, and/or any other value and may be used to multiply each value in a vector representation of the word (e.g., as described below in connection with FIGS. 5-6). The user interface may require the value to be greater than or equal to 1. The first user device 110 may send the indications of weights (e.g., which words are highlighted which color, ratings, and/or numerical values indicating weights, etc.) to the server 130. In some embodiments, the server 130 and/or the first user device 110 may output a notification to the user to confirm one or more weights assigned to one or more words. If a user highlights multiple words in a sequence, the server 130 and/or the first user device 110 may confirm with the user that each word should be highlighted. For example, a user may highlight the words "Wrinkle in Time." Because "in" is a common term (e.g., the term appears higher than a threshold number of times in a database or search object), the server 130 may confirm with the user that "in" should be highlighted. Alternatively, the server 130 may ignore highlighted words if they are common terms (e.g., the terms appear higher than a threshold number of times in a database or search object). Additionally or alternatively, a user may indicate words that should not appear in results output by the server 130 (e.g., blacklisted words). Any search objects that comprise a blacklisted word may be removed from the list of search results.

At step 309, the server 130 may store the word weights received in step 306. The server 130 may store the word weights in a database, such as database 140 discussed above. As noted above, word weights may be associated with a profile of the user. After the first user device 110 authenticates with the server 130, the word weights may be used in search queries received from the first user device 110. The weights stored in the profile may be an average of word weights received from the first user device 110 for a particular user. For example, if a word is assigned a first weight in a first search query and then a second weight in a second search query, the weight of the word stored in the profile may be an average of the first and second weights. The stored weights may be used in subsequent searches requested by the first user device 110. Additionally or alternatively, the stored weights may be used with searches performed by other users (e.g., as discussed in more detail in connection with step 512 of FIG. 5).

As discussed above in connection with step 306, words may be assigned weights so that a user may fine tune a search query and receive search results that more closely match the user's wishes. FIG. 4 shows an example of a UI and/or database entry associated with the user profile. The UI/database entry may comprise a user ID field 401 and a table 403. The user ID 401 may be a sequence of characters that uniquely identify a user associated with the word weights. The table 403 may comprise at least two columns: a first column 405 and a second column 410. The first column 405 may identify one or more words that a user has defined (e.g., assigned) a weight for. The second column 410 may specify the weight associated with each of the one or more words defined by the user. For example, the user associated with user ID 123 may have assigned a weight of 2 to the word "sentiment," a weight of 5 to the word "continuous," and a weight of 3 to the word "arbitrage." As noted above, the weight may be a weight assigned by the user or an average calculated by the weights assigned by the user in one or more prior searches. The weights may be used to modify a vector representation of a search query that comprises any of the words in the word column 405 (e.g., as discussed in more detail in connection with FIGS. 5-6 below).

Figure 5:
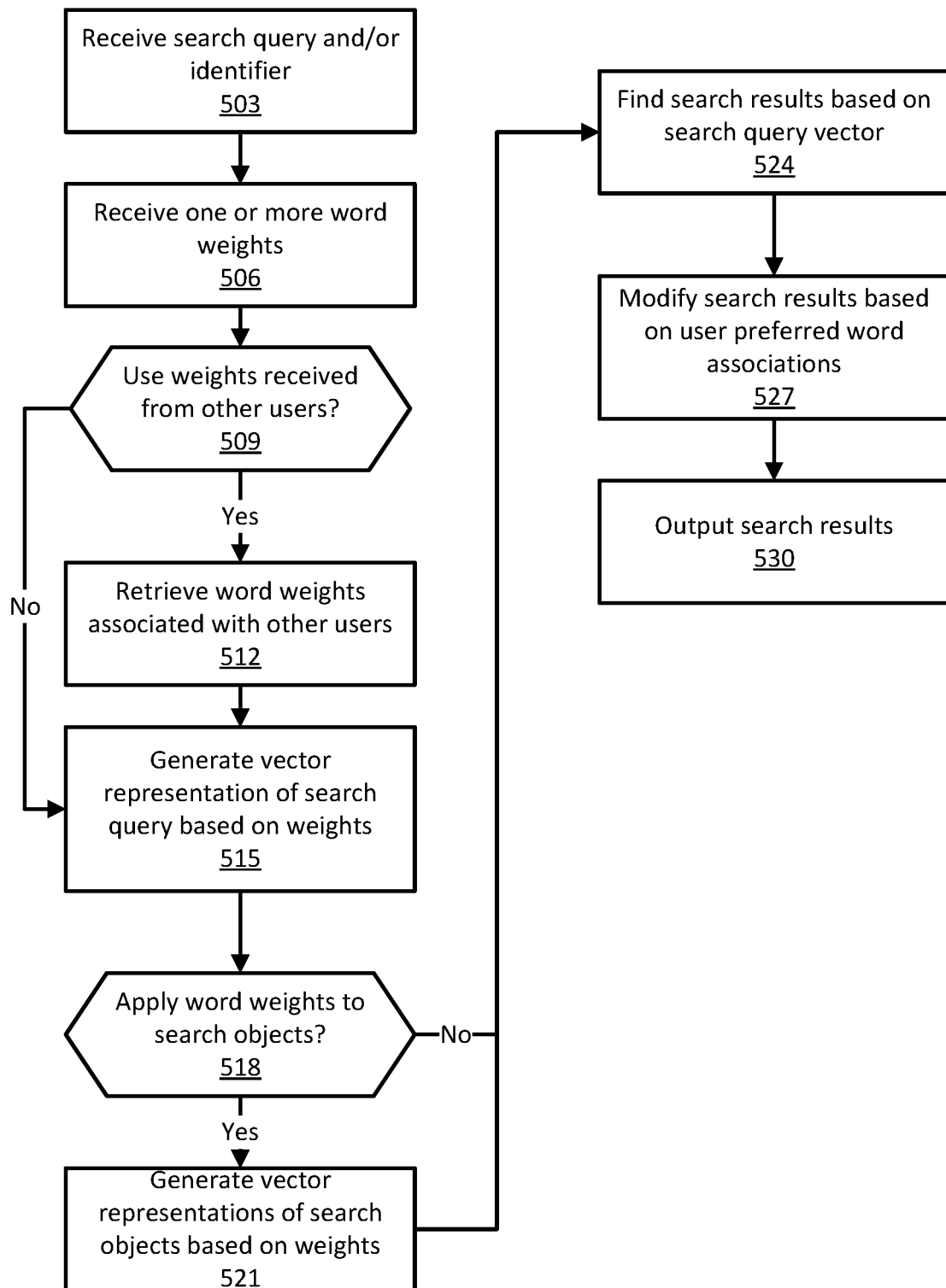
FIG. 5 shows an example method for retrieving information using weighted search queries.

One or more terms in a search query may be emphasized or weighted so that search results are customized according to the weights. Additionally or alternatively, the weights may be applied to words/terms contained in the search objects (e.g., documents, webpages, articles, books, or any other object comprising text) to enhance the ability of a search request to determine results that are relevant to the search query. A user may customize a search query by weighting one or more words over other word(s) in the search query. Using a customized search query, the server 130 may be able to find results that better match the user's desires. FIG. 5 shows an example method for retrieving information using weighted search queries. The example method may be performed using any device or component described in connection with FIGS. 1-3. Although one or more steps of FIG. 5 are described for convenience as being performed by the server 130, or the first user device 110, one, some, or all of such steps may be performed by the second user device 120, the computing device 200, or one or more other computing devices, and steps may be distributed among one or more computing devices, including any computing devices such as those described in connection with FIGS. 1-2. One or more steps of FIG. 5 may be rearranged, modified, repeated, and/or omitted.

At step 503, the server 130 may receive a request to perform a search query from the first user device 110. The request may comprise a search query and/or an identifier. The identifier may be a user identifier, device identifier, cookie, or any other information that may be sent to the server to determine the identity of a user performing the query. The identifier may identify a user associated with the search query (e.g., the user that used the first user device 110 to submit the search query to the server 130). The identifier may be used to retrieve word weights associated with the user (e.g., word weights stored, for example, in a user profile or otherwise as discussed above in connection with FIGS. 3-4). The search query may comprise any number of terms or objects (e.g., words, numbers, and/or other characters). The search query may comprise one or more documents (e.g., with hundreds or thousands of words). The one or more documents may have one or more keywords highlighted, or otherwise marked, that reflect weights of terms in the search query.

At step 506, the server 130 may receive one or more weights associated with the search query. The request received in step 503 may comprise the weights or an indication of the weights. For example, the request may comprise metadata indicating a weight for each word. The weights may be indicated as discussed above in connection with FIG. 3 (e.g., numerical value, highlighting, etc.). A user associated with the first user device 110 may input a weight for one or more words in the search query. Additionally or alternatively, the user may highlight one or more words in the search query. For example, if the search query comprises a document a user may highlight one or more words in the document to indicate that the one or more words should be weighted higher than other words in the document that are not highlighted. The first user device 110 may send the word weights and/or indications of word weights to the server 130 (e.g., as part of the request in step 503 or separately). Additionally or alternatively, the one or more weights may be retrieved from the user profile associated with the user (e.g., the weights stored in the database 140 and/or associated with the profile of the user as discussed above in connection with FIGS. 3-4). The weights received in step 506 may correspond to words that do not appear in the search query (e.g., the weights may correspond to words that are expected to appear in search results). For example, a search query may comprise the words "Philadelphia Eagles scores." The weights received in step 506 may indicate that the words "Philadelphia Eagles" and the word "football" should be given higher weights than other words (e.g., even though "football" does not appear in the search query).

At step 509, the server 130 may determine whether to use weights received from other users. As discussed above in connection with FIG. 3, weights stored for one user may be used in search queries requested by other users. The server 130 may store word weights associated with many different users and may aggregate the weights as discussed in more detail in connection with steps 512-515 below. Using weights from other users may allow the server 130 to perform searches that retrieve better results (e.g., results that comprise what a user is searching for, results that have better recall and/or precision, etc.). Using weights provided by other users may allow a first user (e.g., a new user, a user that is unsure of what to use for weights, or any other user) that has not provided his or her own weights to have more accurate search results. Using weights provided by other users (e.g., in addition to weights provided by the user requesting the search) may prevent overfitting. For example, if a user provides weights emphasizing a particular meaning in a first search and then performs a second search, using weights from other users may increase the chances that the user receives results relevant for the second search (e.g., if the user forgets to indicate weights different from the weights used in the first search, weights from other users may allow the server 130 to provide results that are more relevant to the user's intent for the second search). The server 130 may determine to use weights received from other users, for example, if the request received in step 503 indicates that aggregated weights should be used. Additionally or alternatively, the server 130 may determine to use weights received from other users, for example, if a setting of the server 130 indicates that the server 130 should use weights from other users. Additionally or alternatively, weights associated with other users may be retrieved based on similar interests and/or similar searches performed by the other users. For example, if a first user is performing a search for Philadelphia Eagles, and a second user has previously requested a query for Philadelphia Eagles and assigned weights to one or more terms in the query, the weights may be used for the first user's search.

If the server 130 determines that weights from other users should be used, step 512 may be performed. At step 512, the server 130 may retrieve weights (e.g., from the database 140) associated with other second users (e.g., users other than the user associated with search query received in step 503). The weights associated with other users may be aggregated. The weights retrieved may be associated with a particular group of users that are associated with the user that sent the search query received in step 503. For example, a group of coworkers may aggregate weights so that any weight used for a word reflects weights given by any member of the group. The weights may be aggregated for each word individually. For example, if the server 130 has stored weights provided by three different users (e.g., three coworkers) for a first word, the server 130 may aggregate each of the three weights into one weight. For example, the server 130 may aggregate the weights by taking the average of the three weights. Alternatively, the server 130 may aggregate the weights using addition (e.g., the aggregated weight may be the sum of each individual weight). If server 130 determines that weights from other users should not be used, step 512 may be skipped and the method may proceed to step 515.

At step 515, the server 130 may generate a vector representation of the search query (e.g., a search query vector) based on the weights received in step 506 and/or the weights retrieved in step 512. The search query may be mapped to a vector of numbers (e.g., real numbers, integers, etc.) to create a vector representation of the search query. The vector representation of the search query may be generated using a machine learning model. The server 130 may use a machine learning model to generate the vector representation. The machine learning model may be a neural network, such as a generative adversarial network (GAN) or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. The neural network may be trained using supervised learning, unsupervised learning, back propagation, transfer learning, stochastic gradient descent, learning rate decay, dropout, max pooling, batch normalization, long short-term memory, skip-gram, or any equivalent deep learning technique. Additionally or alternatively, the machine learning model may comprise a support vector machine, logistic regression, random forest, or an equivalent thereof. The machine learning model may map search queries with similar meanings to similar vector representations. For example, the cosine distance between the vector representations of two search queries may indicate how similar the two search queries are (e.g., similarity in semantics and/or syntax). For example, two search queries may be determined to be semantically similar if the cosine distance between each query's vector representation is close to 1 (e.g., 0.7, 0.8, 0.9, etc.).

A vector representation of the search query may be generated using vector representations of each individual word in the search query. A machine learning model may map words with similar meanings to similar vector representations. For example, the cosine distance between the vector representations of two similar words may be close to 1 (e.g., 0.7, 0.8, 0.9, etc.). A vector representation of the search query may be generated by averaging the vector representation of each individual word in the search query. For example, as shown in FIG. 8, a first vector representation 805 may be generated for a first word in a search query. A second vector representation 810 may be generated for a second word in the search query. The vector representations 805 and/or 810 may comprise any number of values (e.g., 100, 300, 2000, etc.). The vector representations 805 and 810 may be the same length (e.g., they may have the same number of values) or they may be different lengths. A third vector representation 815 may be generated to represent the search query as a whole. The vector representation 815 may comprise an average of the vector representations 805 and 810. For example, the first value in the vector representation 815 may be the average of the first value in the first vector representation 805 and the first value in the second vector representation 810. The second value in the third vector representation 815 may be the average of the second value in the first vector representation 805 and the second value in the second vector representation 810, and so on.

Figure 9:
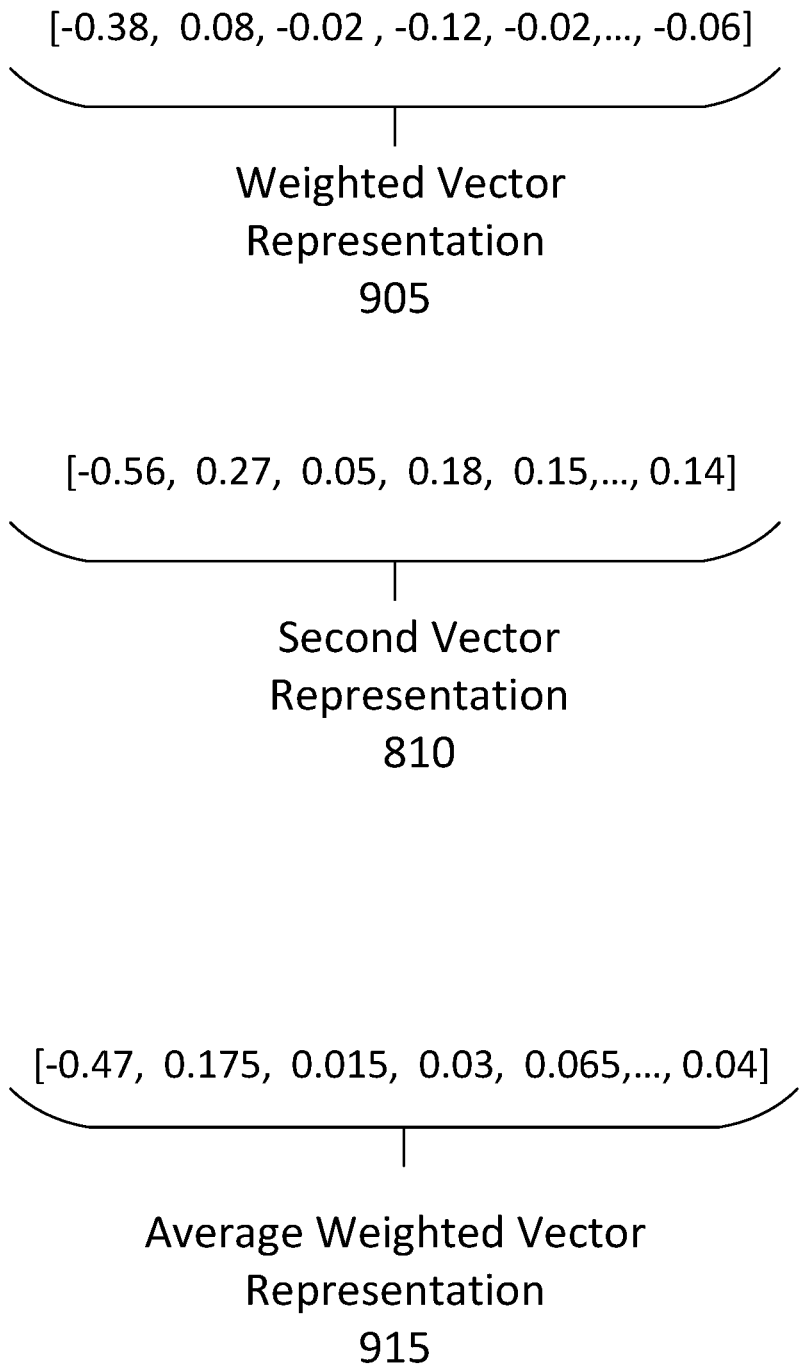
FIG. 9 shows an example weighted vector representations of a search query.

Returning to step 515 of FIG. 5, the vector representation of the search query may be generated using the weights received in step 506 and/or the weights retrieved in step 512. The server 130 may adjust the values in a word vector that has been assigned a weight by a user (e.g., as discussed above in connection with FIGS. 3-4, and/or steps 506-512). The server 130 may adjust the values in the word vector by multiplying the values in the word vector by the weight assigned to the word. For example, if a word was assigned a weight of 2, the server 130 may multiply each value in the word vector by 2 (e.g., prior to generating the vector representation of the search query). The server 130 may put a constraint on the maximum value that a weight may be. For example, if the maximum weight is 10, and a user enters a weight of 100 for a word, the server 130 may use the weight of 10 for the word. Vector representations of words that have not been assigned an increased weight may be left as is. For example, if a second word in the search query is assigned a weight of 1, the server 130 may not multiply the vector representation of the first word by a value (e.g., a weight). The server 130 may multiply each word vector by the weight assigned to the word. The server 130 may then generate a vector representation of the search query by taking the average of each word vector in the search query. FIG. 9 shows an example of weighted vector representations and builds off of the examples shown in FIG. 8. A weighted vector representation 905 may be generated using the first vector representation 805 and a weight corresponding to the word that the vector 805 represents. Each value in the first vector representation 805 has been multiplied by 2 (e.g., the weight of the first word) to generate the weighted vector representation 905. The average weighted vector representation 915 is the average of the weighted vector representation 905 and the second vector representation 810. The average weighted vector representation 915 may be used as the vector representation of the search query containing the first word and the second word.

At step 518, the server 130 may determine whether to apply the word weights received in step 506 and/or the word weights retrieved in step 512 to the objects being searched (e.g., the search objects). The server 130 may determine to apply the word weights based on a setting of the server 130 and/or information indicated in the request received in step 503. For example, the first user device 110 may indicate in the request that the word weights should be applied to the search objects. If such an indication is made, the server 130 may determine to apply the word weights to the search objects as discussed in more detail in connection with step 521. If the server 130 determines to apply the word weights to the search objects, step 521 may be performed. Otherwise, step 524 may be performed.

At step 521, the server 130 may generate vector representations of search objects (e.g., search object vectors) based on the word weights (e.g., the word weights received in step 503 and/or the word weights retrieved in step 503). The objects being searched may comprise documents, webpages, books, blogs, and/or any other object comprising objects or terms (e.g., words, characters, symbols, numbers, equations, etc.). Word vectors may be generated for each object. For example, the server 130 may use the same machine learning model that was used to generate the word vectors as described in connection with step 515 or the server 130 may use a different machine learning model to generate the word vectors for each search object. The server 130 may generate word vectors for every object/term in a search object or only a portion of the objects/terms in a search object. Each word vector in an object may be multiplied by a corresponding weight (e.g., as described above in connection with step 515 and FIGS. 8-9). The server 130 may then generate a vector representation of an object by averaging the weighted word vectors corresponding to the object. Weighting the vector representations of the search objects may yield more relevant results for the search query. By applying weights to both the search objects and the search query, a distance metric (e.g., cosine distance, or any other distance metric) may provide a better indication that the search query matches the search object.

At step 524, the server 130 may find search results based on the search query vector. The server 130 may use the search query vector generated (e.g., in step 515) to find search objects (e.g., documents, webpages, URLs, books, any object comprising text, and/or any other object that is determined to match the user's search query) to return as results to the first user device 110. The server 130 may compare the search query vector with one or more search object vectors (which may be weighted based on the weights received in step 506 and/or the weights retrieved in step 512, for example, if step 521 was performed). If a comparison between the search query vector and a search object vector satisfies a threshold, the server 130 may add the search object (or a location, e.g., a URL, indicating the search object) to a list of results that may be output to the first user device 110. The server 130 may compare the search query vector and a search object vector using a distance metric (e.g., cosine similarity, word mover's distance, or any other distance metric). If the result yielded by the distance metric satisfies the threshold, the server 130 may add the search object to the list of results. For example, if a cosine similarity between the search query vector and the search object vector is above a threshold value (e.g., 0.3, 0.4, 0.5, 0.6, 0.7, 0.8, etc.), the search object may be added to the list of results.

At step 527, the server 130 may modify the search results based on user preferred word associations. The user profile associated with the request received in step 503 may indicate words that should not appear in results output by the server 130 (e.g., blacklisted words). Any search objects that comprise a blacklisted word may be removed from the list of search results.

At step 530, the server 130 may output the search results. For example, the server 130 may send a list of the search results or indications of search objects (e.g., URLs) to the first user device 110.

Figure 6:
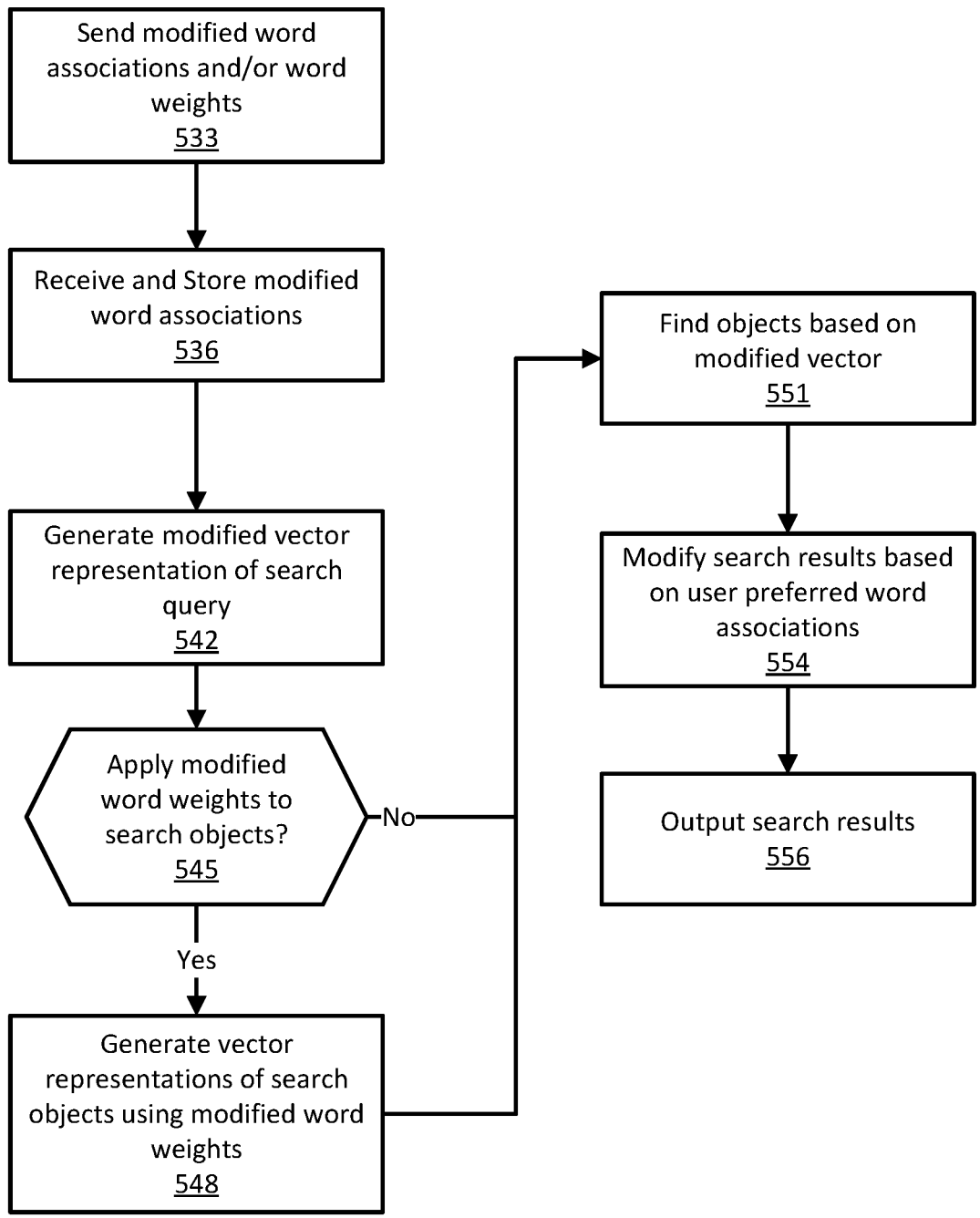
FIG. 6 shows an example method for training a model for retrieving information using modified search queries.

A user may determine that results output by the server 130 are not adequate for the user's needs and may try to achieve different results by adjusting weights of one or more search terms in a query. Additionally or alternatively, the user may highlight or otherwise identify words in the results that indicate results that are not a good match to the search query. The input from the user may enable the server 130 to improve the results obtained in future searches. FIG. 6 shows an example method for training a model for retrieving information using modified search queries and/or other input from a user. The example method may be performed using any device or component described in connection with FIGS. 1-5. Although one or more steps of FIG. 6 are described for convenience as being performed by the server 130, or the first user device 110, one, some, or all of such steps may be performed by the second user device 120, the computing device 200, or one or more other computing devices, and steps may be distributed among one or more computing devices, including any computing devices such as those described in connection with FIGS. 1-2. One or more steps of FIG. 6 may be rearranged, modified, repeated, and/or omitted.

At step 533, the first user device 110 may send the modified weights and/or the modified word associations to the server 130. As described above in connection with FIG. 5, the server 130 may output search results to the first user device 110. After receiving the results, the user may wish to obtain different results (e.g., the results are not what the user is looking for). The first user device 110 may receive updated weights (e.g., changes in values indicating weights, changes in highlighting of one or more words in the search query) as input from the user.

Additionally or alternatively, the first user device 110 may receive updated word associations as input from the user. The word associations may indicate that search objects comprising particular words should not appear in search results. Additionally or alternatively, the user may provide input that may be used by the server 130 to train a machine learning model (e.g., a reinforcement machine learning model) to improve search results. The user may indicate that a particular result does not match the search query and may indicate (e.g., by highlighting or other indication) one or more words in the result that show that the result is not a relevant match for the search query. The machine learning model may be trained based on the highlighting or other input to prevent similar results from being output by the server 130 in future searches. For example, a search query may comprise the words "Philadelphia Eagles." One or more search results may be about ornithology. The user may highlight the word ornithology in the search results that the user thinks are not relevant to the search query. The server 130 may then train, based on the indication provided by the user, the machine learning model to improve the relevance of results found during future searches (e.g., future search results may not contain webpages about ornithology). The machine learning model may use a triple loss objective function. The machine learning model may use positive (e.g., words that are related to the search query) and negative (e.g., words that are not related to the search query) samples given an anchor point. The triple loss objective function may be used to update the machine learning model to shift positive vector representations towards the anchor point and shift negative vector representations away from the anchor point. The machine learning model may be specific to the user (e.g., using only data provided from the user to train) or may be a general model (e.g., that uses data from many different users to train).

At step 536, the server 130 may receive the modified weights and/or word associations and may store them in a database, such as database 140 described above. The server 130 may associate the modified weights with a user ID so that they may be used in subsequent searches requested by a user associated with the user ID.

At step 542, the server 130 may generate a modified vector representation of the search query received in step 503 of FIG. 5. The modified search query vector may be generated using the modified word weights received in step 536. The modified search query vector may be generated in a similar manner as the search query vector described in connection with step 515 of FIG. 5. For example, instead of multiplying the word vectors that correspond to words in the search query by the weights received in step 503 of FIG. 5, the server 130 may multiply each word vector by its corresponding modified weight received in step 536.

At step 545, the server may determine whether to apply the modified weights to search objects. Step 545 may be performed as described in connection with step 518 of FIG. 5. If the server 130 determines that the modified weights should be applied to the search objects, step 548 may be performed. Otherwise, step 551 may be performed.

At step 548, the server 130 may generate vector representations of search objects using the modified word weights received in step 536. The vector representations of the search objects may be generated as described in connection with step 521 of FIG. 5, for example, using the modified weights instead of the word weights received in step 506.

At step 551, the server 130 may find objects (e.g., documents, webpages, URLs, books, any object comprising text, and/or any other object that is determined to match the user's search query) using the modified vector representation of the search query. Step 551 may be performed as described in connection with step 524 of FIG. 5, for example, using the modified search query vector. At step 554, the server 130 may modify the search results based on user preferred word associations as described in step 527 of FIG. 5. At step 556, the server 130 may output the search results modified in step 554. For example, the server 130 may send the modified search results to the first user device 110. By adjusting the weights of search terms and/or search objects, a user may have additional control over the results that are returned in a search process. In addition, a user may be able to provide feedback that may be used to train a machine learning model so that more relevant results are returned in future searches.

Figure 7A:
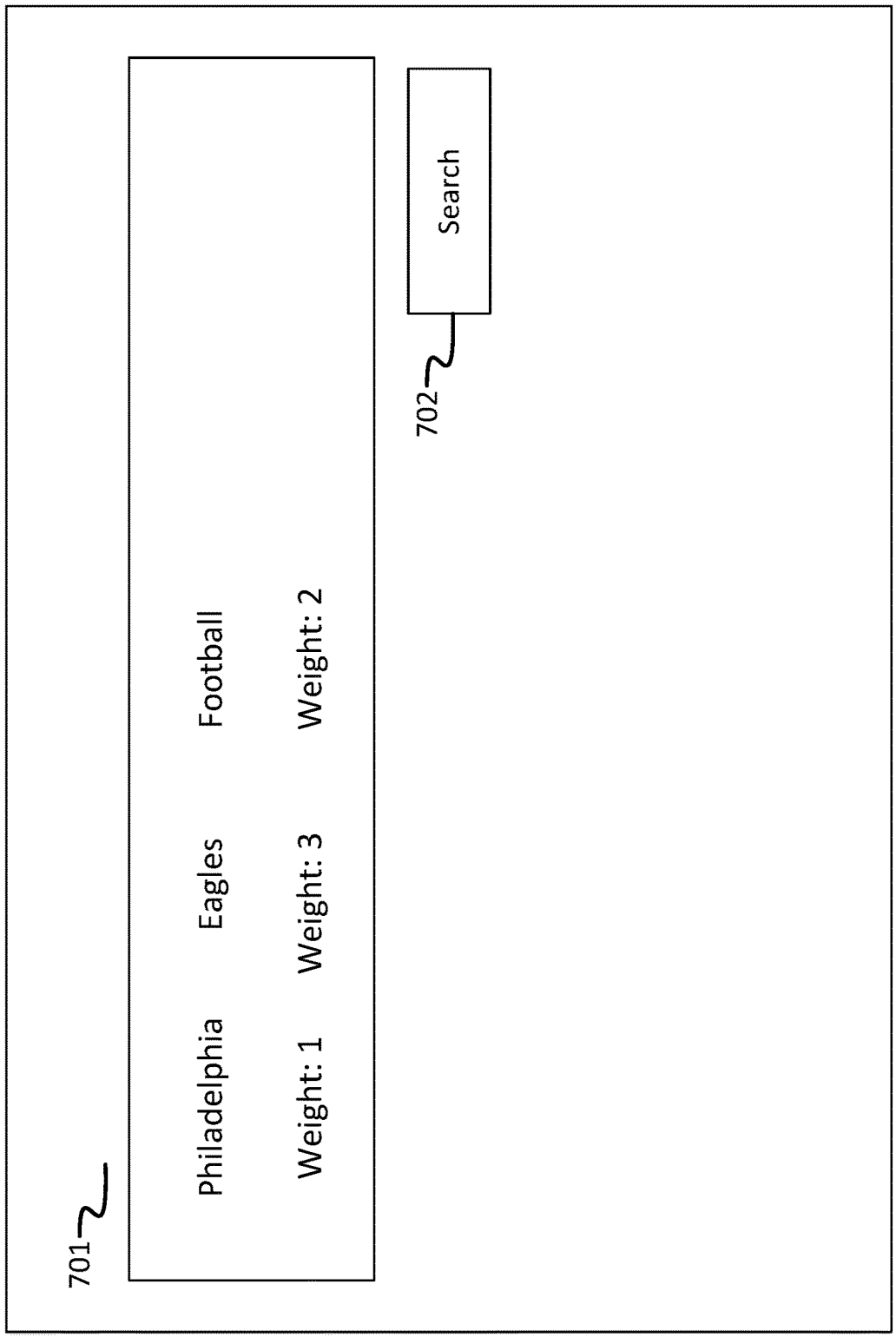
FIGS. 7A-7B show example user interfaces for weighting words in a search query.
Figure 7B:
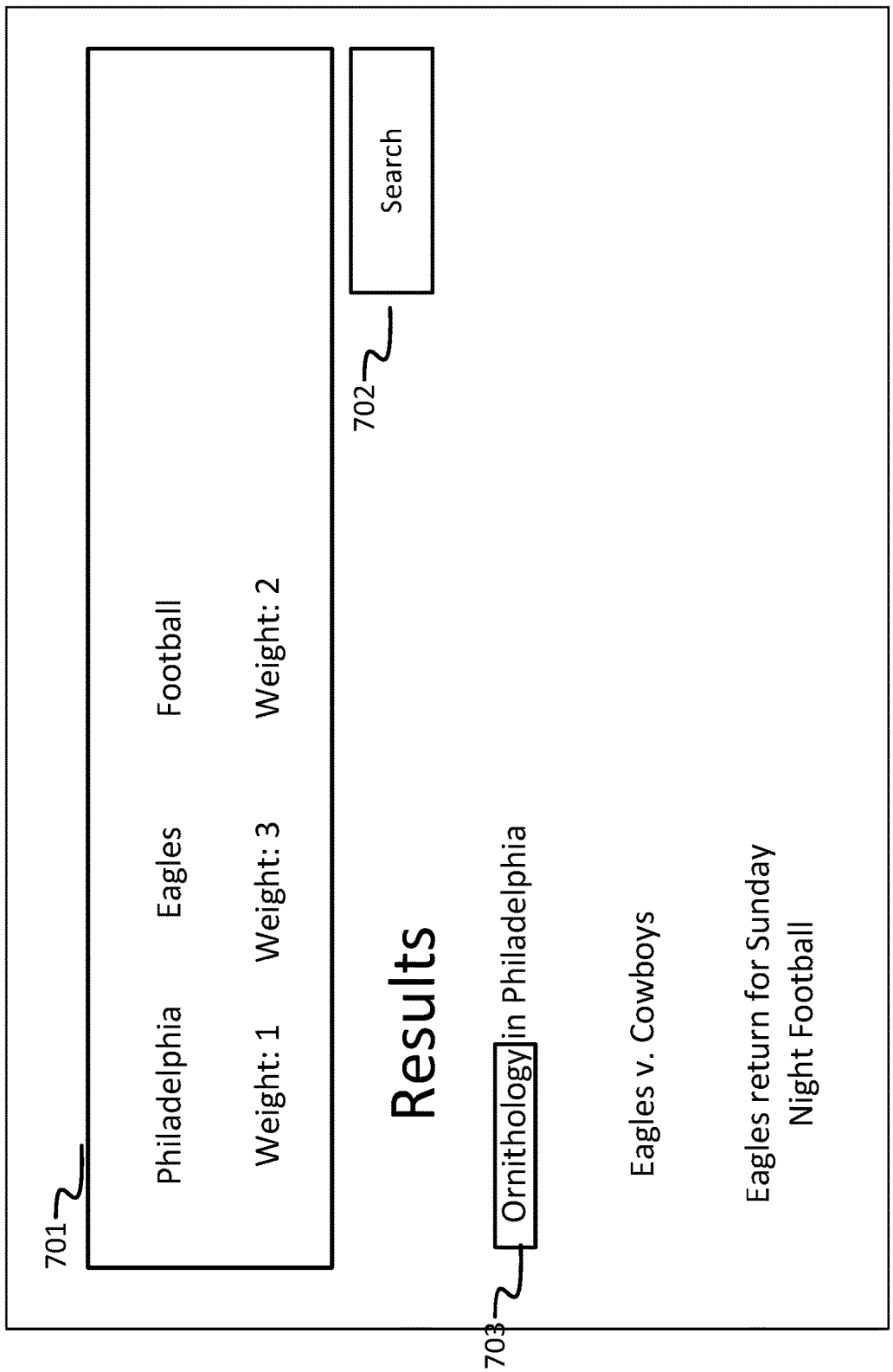

FIGS. 7A-7B show example user interfaces that may be used to input a search query and/or modify the weights. Referring to FIG. 7A, a user may enter a search query into the input box 701. For example, the search query may comprise the words "Philadelphia Eagles Football." The user may input a weight for each term (e.g., as discussed above in connection with FIGS. 5-6). The term Philadelphia may be assigned a weight of 1, the term Eagles may be assigned a weight of 3, and the term Football may be assigned a weight of 2. In this example, the user may assign the word "Eagles" a higher weight than other terms because the user wants the search results be more related to the Eagles football team. The term "Philadelphia" may be given no additional weight (e.g., the weight is 1) because the user does not want results discussing the city Philadelphia generally. The button 702 may be used to submit the search query (e.g., to send the search query from the first user device 110 to the server 130).

Referring to FIG. 7B, the user may be shown search results received from the server 130. The user may use the user interface to modify the weights. Additionally or alternatively, the user may indicate results that the user does not think are relevant to the search query. For example, the user may highlight or otherwise indicate the term ornithology 703. The server 130 may use the indication of the term 703 (e.g., an indication that it does not match the search query) to train a machine learning model to improve future search results (e.g., as described in connection with FIG. 6 above).

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving, by a server and from a user device, a first search query, wherein the first search query comprises a first word and a second word;
   receiving, from the user device, a weight associated with the first word in the first search query, wherein the weight is selected by interaction with a user interface of the user device;

generating, using a machine learning model, based on the first search query, and based on the weight, a vector representation of the first search query, wherein the first word is weighted higher than the second word in the vector representation;

executing, by the server and based on the vector representation, a second search query;

receiving, based on the executed second search query, search results comprising one or more documents; and causing the search results to be displayed by the user device.

2. The method of claim 1, wherein receiving the first search query comprises receiving a document, wherein the generating the vector representation comprises:

generating, based on the weight received from the user device, a second vector representation of the document, and comparing the vector representation and the second vector representation, and wherein the second search query is further based on a comparison of the vector representation and the second vector representation.

3. The method of claim 1, further comprising:

receiving a user identifier from the user device, wherein the generating the vector representation is further based on weights of words stored in a user profile associated with the user identifier.

4. The method of claim 1, wherein the first search query comprises a document.

5. The method of claim 4, further comprising:

determining, based on highlighting within the document, the weight associated with the first word in the first search query.

6. The method of claim 4, further comprising:

determining, based on a first color of highlighting within the document, the weight associated with the first word in the first search query; and determining, based on a second color of highlighting within the document, a second weight associated with the second word in the first search query.

7. The method of claim 1, wherein the weight indicates a value, and wherein the generating the vector representation further comprises:

generating a second vector representation of the first word, and generating, by multiplying the second vector representation by the value, the vector representation of the first search query.

8. The method of claim 1, wherein the first search query comprises a third word, wherein the generating the vector representation of the first search query comprises:

determining, based on weights previously assigned, by other users, to the third word, a weight for the third word, wherein, the third word is weighted differently from the first word in the vector representation of the first search query.

9. A computer-implemented method comprising:

receiving, by a server and from a user device, a first search query, wherein the first search query comprises a first word and a second word;

receiving a first weight associated with the first word and a second weight associated with the second word, wherein the first weight and the second weight are associated with weights previously assigned by other users that have performed searches similar to the first search query;

determining, based on the received weights and the first search query, a weight associated with the first word in the first search query;

generating, using a machine learning model, based on the first search query, and based on the weight, a vector representation of the first search query, wherein the first word is weighted higher than the second word in the vector representation;

executing, by the server and based on the vector representation, a second search query;

receiving, based on the executed second search query, search results comprising one or more documents; and causing the search results to be displayed by the user device.

10. The method of claim 9, wherein the determining the weight associated with the first word in the first search query comprises averaging first weights previously assigned by the other users to the first word.

11. The method of claim 9, wherein receiving the first search query comprises receiving a document, wherein the generating the vector representation comprises:

generating, based on the weights, a second vector representation of the document, and comparing the vector representation and the second vector representation of the document, and wherein the second search query is further based on a comparison of the vector representation and the second vector representation.

12. The method of claim 9, further comprising:

receiving a user identifier from the user device, wherein the generating the vector representation is further based on weights of words stored in a user profile associated with the user identifier.

13. The method of claim 9, wherein the first search query comprises a document, the method further comprising:

determining, based on highlighted words within the document, the weight associated with the first word in the first search query and a second weight associated with the second word.

14. The method of claim 9, wherein the weight indicates a value, and wherein the generating the vector representation further comprises:

generating a second vector representation of the first word, and generating, by multiplying the second vector representation by the value, vector representation of the first search query.

15. The method of claim 9, further comprising:

prior to outputting the search results to the user device, removing, based on user preferences associated with the user device, a subset of the one or more documents from the search results.

16. A computer-implemented method comprising:

receiving, by a server and from a user device, a first search query, wherein the first search query comprises a first word and a second word;

receiving, from the user device, a weight associated with the first word in the first search query, wherein the weight is selected by interaction with a user interface of the user device;

generating, based on the first search query and based on the weight, a first vector representation of the first search query;

executing, by the server and based on the first vector representation, a second search query;

receiving, based on the executed second search query, a document;

generating, based on the weight, a second vector representation of the document, wherein the first word is weighted higher than the second word in the second vector representation of the document;

comparing the first vector representation and the second vector representation to determine whether the document matches the first search query; and outputting, based on a determination that the document matches the first search query, search results comprising the document.

17. The method of claim 16, further comprising:

receiving a user identifier from the user device, wherein the generating the first vector representation of the first search query is based on weights of words stored in a user profile associated with the user identifier.

18. The method of claim 16, wherein the first search query comprises a second document, and wherein the receiving the weight comprises determining, based on highlighted words within the second document, the weight associated with the first word in the first search query.

19. The method of claim 16, wherein the weight indicates a value, and wherein the generating the first vector representation of the first search query comprises multiplying, by the value, a third vector representation of the first word.

20. The method of claim 16, wherein receiving the document further comprises receiving a plurality of documents, and prior to outputting the search results to the user device, removing, based on a user profile associated with the user device, one or more documents, of the plurality of documents, from the search results.

* * * * *